(12) United States Patent
Liu

(10) Patent No.: US 10,527,213 B2
(45) Date of Patent: Jan. 7, 2020

(54) WEDGE CLAMP QUICK RELEASE CONNECTOR

(71) Applicant: Hsiu-Hsiung Liu, New Taipei (TW)

(72) Inventor: Hsiu-Hsiung Liu, New Taipei (TW)

( * ) Notice: Subject to any disclaimer, the term of this patent is extended or adjusted under 35 U.S.C. 154(b) by 0 days.

(21) Appl. No.: 16/036,562

(22) Filed: Jul. 16, 2018

(65) Prior Publication Data

US 2019/0178428 A1   Jun. 13, 2019

(30) Foreign Application Priority Data

Dec. 13, 2017   (CN) ................. 2017 2 1730388 U

(51) Int. Cl.

| *F16L 37/12* | (2006.01) |
|---|---|
| *F16L 37/46* | (2006.01) |
| *F16L 37/138* | (2006.01) |
| *F16L 37/42* | (2006.01) |

(52) U.S. Cl.
CPC ........... *F16L 37/123* (2013.01); *F16L 37/138* (2013.01); *F16L 37/42* (2013.01); *F16L 37/46* (2013.01)

(58) Field of Classification Search
CPC ..... F16L 37/123; F16L 37/138; F16L 137/42; F16L 37/46
See application file for complete search history.

(56) References Cited

U.S. PATENT DOCUMENTS

| 2,935,338 | A  | * | 5/1960  | Mills, Jr. ................. | F16L 37/23 |
|---|---|---|---|---|---|
|           |    |   |         |                              | 251/149.5  |
| 3,468,562 | A  | * | 9/1969  | Chow ...................... | F16L 37/22 |
|           |    |   |         |                              | 285/81     |
| 4,557,508 | A  | * | 12/1985 | Walker .................. | E21B 33/038|
|           |    |   |         |                              | 285/84     |
| 5,375,286 | A  | * | 12/1994 | Harrah .................. | A46B 5/0095|
|           |    |   |         |                              | 15/147.1   |
| 7,793,914 | B2 | * | 9/2010  | Danielson ........... | F16L 37/0848|
|           |    |   |         |                              | 251/149.6  |
| 8,262,138 | B2 | * | 9/2012  | Rischen ................ | F16L 37/138|
|           |    |   |         |                              | 285/255    |

* cited by examiner

*Primary Examiner* — Mary E McManmon
*Assistant Examiner* — Kevin R Barss
(74) *Attorney, Agent, or Firm* — Rabin & Berdo, P.C.

(57) ABSTRACT

A wedge clamp quick release connector has a main body, a positioning mount, and a quick connecting device. The quick connecting device has a sliding sleeve, at least one wedge clamp and a sleeve spring. The sliding sleeve has a spring recess and a clamp recess. Each wedge clamp is moveably held in the positioning mount, and has a stop portion and a wedge portion. The stop portion has an external surface and a stop plane, and the wedge portion protrudes from a middle of the stop plane and has an internal surface opposite the external surface and two bevels formed on two edges of the internal surface. The sleeve spring is mounted in the spring recess of the sliding sleeve. The engagement between the connector and a corresponding plug is in reliable surface contact by corresponding bevels of each wedge clamp and the plug.

8 Claims, 10 Drawing Sheets

WEDGE CLAMP QUICK RELEASE CONNECTOR

BACKGROUND OF THE INVENTION

1. Field of the Invention

The present invention relates to a quick release connector, and more particularly to a quick release connector that is engaged with a plug with wedge clamps.

2. Description of Related Art

A quick release connector is used in pipe connections. With reference to FIG. 10, a conventional quick release connector 90 substantially comprises a sliding sleeve 91, multiple balls 93, and a sleeve spring 95, and is engaged with a plug by the engagements between the balls 93 of the connector 90 and a recess in the plug. However, using the balls 93 for engaging the plug has the following shortcomings. First of all, the engagement between each ball 93 and the recess of the plug is in an unreliable point contact, so the plug may be shaken. Second, the stress may be concentrated on the contact point of the plug and each ball 93, and the excessive stress may damage the contact surface of the plug.

To overcome the shortcomings, the present invention tends to provide a wedge clamp quick release connector to mitigate or obviate the aforementioned problems.

SUMMARY OF THE INVENTION

The main objective of the invention is to provide a quick release connector that is engaged with a plug by the engagement of corresponding beveled surfaces of the connector and the plug.

The wedge clamp quick release connector in accordance with the present invention has a main body, a positioning mount, a valve device, and a quick connecting device.

The main body is tubular and has an air passage formed in the main body and two ends respectively defined as a mounting end and a connecting end, and each end has an opening communicating with the air passage.

The positioning mount is detachably connected to the mounting end of the main body by a threaded connection, is tubular, and has a plug chamber and at least one wedge clamp hole. The plug chamber is formed in the positioning mount and has an opening being away from the main body. The at least one wedge clamp hole is formed radially through the peripheral wall of the positioning mount and communicates with the plug chamber. Each wedge clamp hole has an outer portion, an inner portion, and a shoulder plane. The outer portion is formed in the peripheral wall of the positioning mount away from the plug chamber. The inner portion formed in the peripheral wall of the positioning mount and extends from a middle of the outer portion of the wedge clamp hole to the plug chamber. The shoulder plane is formed between the outer portion and the inner portion of the wedge clamp hole.

The valve device is mounted between the main body and the positioning mount, and selectivity communicates with the air passage of the main body and the plug chamber of the positioning mount.

The quick connecting device is mounted on the positioning mount and has a sliding sleeve, at least one wedge clamp, and a sleeve spring. The sliding sleeve is slidably mounted around the positioning mount and has a spring recess formed in an end of the sliding sleeve facing the main body, and a clamp recess formed in the end of the sliding sleeve opposite the spring recess. The at least one wedge clamp is movably held in the at least one wedge clamp hole of the positioning mount, and each wedge clamp has a shoulder portion and a wedge portion. The shoulder portion is formed on the wedge clamp away from the positioning mount and has an external surface being convex and a stop plane facing the shoulder plane of a corresponding one of the at least one wedge clamp hole of the positioning mount. The wedge portion is mounted in the inner portion of the corresponding one of the at least one wedge clamp hole, is formed on and protrudes from a middle of the stop plane of the wedge clamp, and has an internal surface formed on an end of the wedge portion opposite to the shoulder portion and being concave, and two bevels respectively formed along two curved edges of the internal surface of the wedge portion. The sleeve spring is mounted in the spring recess of the sleeve and has two ends respectively abutting against the main body and the sliding sleeve.

Other objects, advantages and novel features of the invention will become more apparent from the following detailed description when taken in conjunction with the accompanying drawings.

DETAILED DESCRIPTION OF PREFERRED EMBODIMENT

Figure 1:
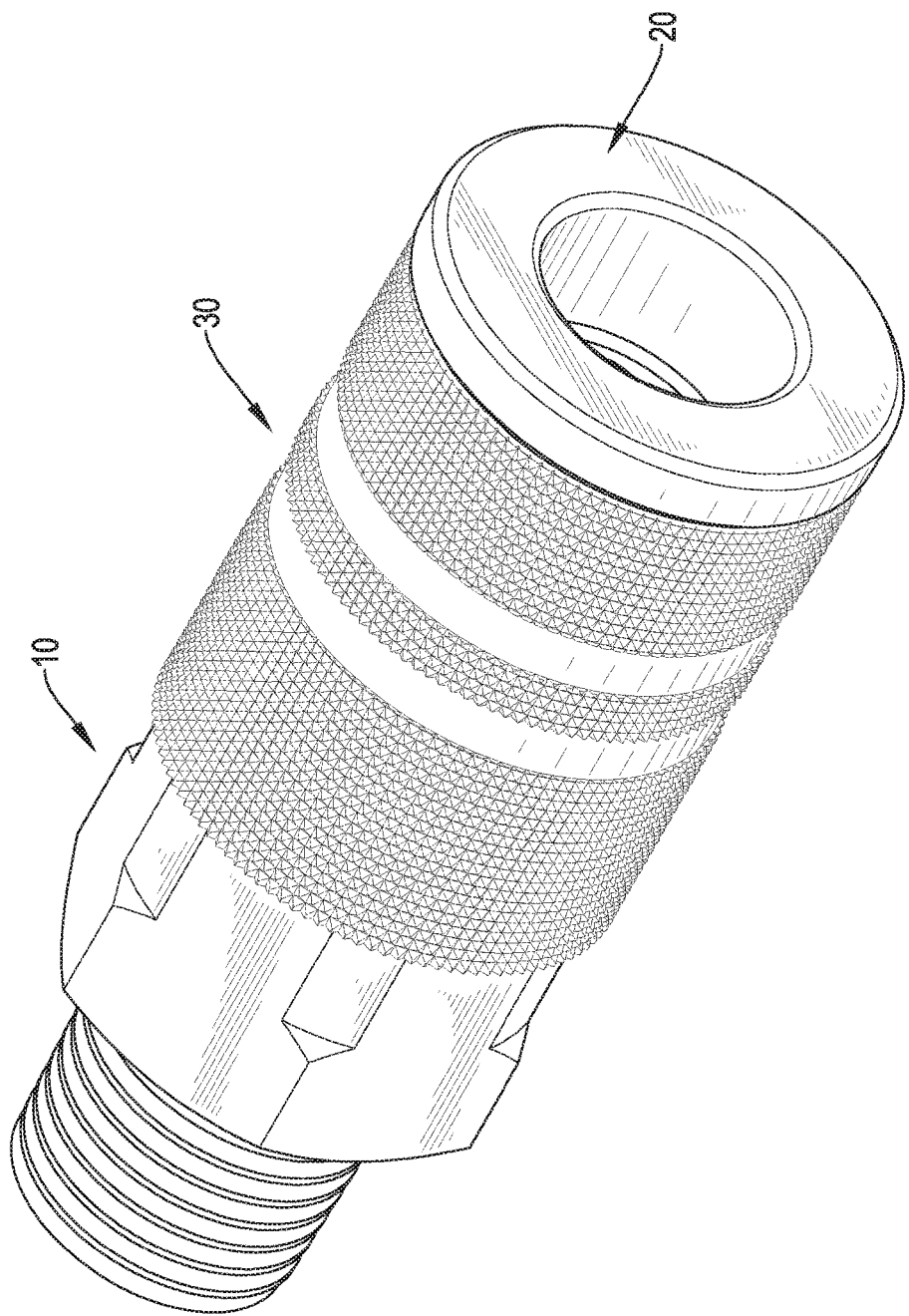
FIG. 1 is a perspective view of a first embodiment of a wedge clamp quick release connector in accordance with the present invention.
Figure 2:
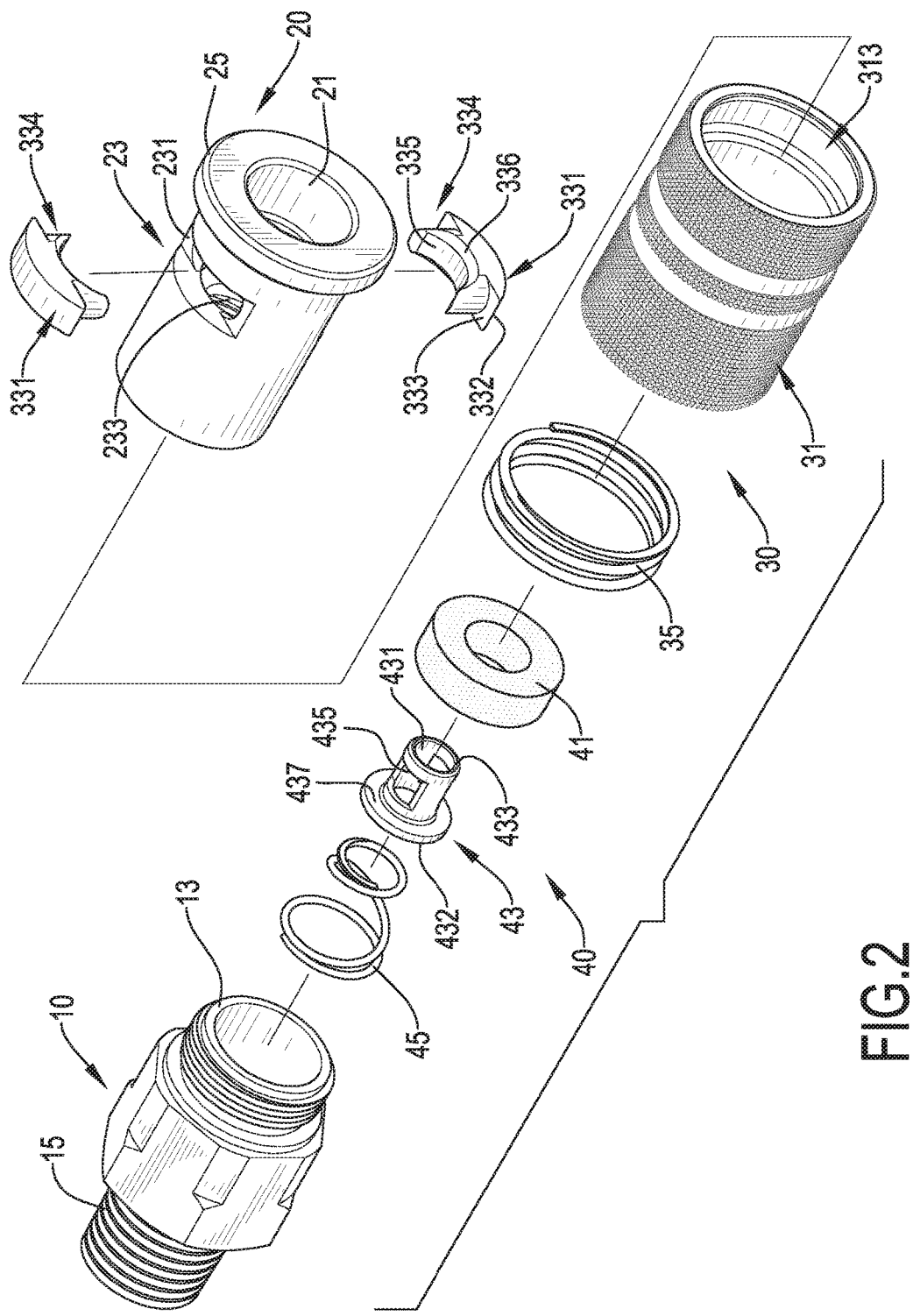
FIG. 2 is an exploded perspective view of the wedge clamp quick release connector in FIG. 1.

With reference to FIGS. 1 to 4, a wedge clamp quick release connector in accordance with the present invention comprises a main body 10, a positioning mount 20, a quick connecting device 30, and a valve device 40.

The main body 10 is tubular and has an air passage and two ends. The air passage is formed in the main body 10, and has two different diameters. The segment of the air passage with the larger diameter is defined as a valve chamber 11. Each of the two ends of the main body 10 has an opening communicating with the air passage. One of the ends that is adjacent to the valve chamber 11 is defined as a mounting end 13, and the other end is defined as a connecting end 15. The connecting end 15 of the main body 10 is connected to an air compressor. Preferably, the main body 10 has two connecting threads respectively formed on the mounting end 13 and the connecting end 15.

The positioning mount 20 is detachably connected to the mounting end 13 of the main body 10 by a threaded connection. The positioning mount 20 is tubular and has a plug chamber 21 and two wedge clamp holes 23. The plug chamber 21 is formed in the positioning mount 20, and has an opening defined in an end of the positioning mount 20 away from the main body 10 and multiple diameters gradually larger, and the segment of the largest diameter of the plug chamber 21 is away from the main body 10. The valve device 40 is mounted between the main body 10 and the positioning mount 20, and selectively communicates with the valve chamber 11 of the main body 10 and the plug chamber 21 of the positioning mount 20. The two wedge clamp holes 23 are respectively formed radially through a peripheral wall of the positioning mount 20, are diametrically opposite each other, and communicate with the plug chamber 21. Each wedge clamp hole 23 has an outer portion, an inner portion 233, and a shoulder plane 231. The outer portion is formed away from the plug chamber 21 of the positioning mount 20. The inner portion 233 extends from a middle of the outer portion to the plug chamber 21. The shoulder plane 231 is formed between the inner portion 233 and the outer portion. Preferably, the positioning mount 20 has a flange 25 protruding outward and is formed around the peripheral wall of the positioning mount 20 near the opening of the plug chamber 21.

The quick connecting device 30 is mounted on the positioning mount 20, and has a sliding sleeve 31, two wedge clamps 33 and a sleeve spring 35. The sliding sleeve 31 is slidably mounted around the positioning mount 20, and has a spring recess 311 and a clamp recess 313. The spring recess 311 is formed in an end of the sliding sleeve 31 that faces the main body 10. The clamp recess 313 is formed in another end of the sliding sleeve 31 opposite the spring recess 311 and corresponds in position to the wedge clamp holes 23 of the positioning mount 20. Each wedge clamp 33 is movably held in one of the wedge champ holes 23 of the positioning mount 20, and may be shifted between the corresponding wedge clamp hole 23 of the positioning mount 20 and the clamp recess 313 of the sliding sleeve 31. Each wedge clamp 33 has a shoulder portion 331 and a wedge portion 334. The shoulder portion 331 is formed on the wedge clamp 33 away from the positioning mount 20, and has an external surface 332 and a stop plane 333. The external surface 332 of the shoulder portion 331 is a convex surface. The stop plane 333 of the shoulder portion 331 is a plane facing and parallel to the shoulder plane 231 of the corresponding wedge clamp hole 23. The wedge portion 334 is mounted in the inner portion 233 of the corresponding wedge clamp hole 23 of the positioning mount 20, is formed on and protrudes from the middle of the stop plane 333, and has an internal surface 335 and two bevels 336. The internal surface 335 of the wedge portion 334 is formed on an end of the wedge portion 334 opposite to the shoulder portion 331 and is concave, and has two curved edges. The two bevels 336 are respectively formed along the two curved edges of the internal surface 335 of the wedge portion 334. The sleeve spring 35 is mounted in the spring recess 311 of the sliding sleeve 31, and has two ends respectively abutting against the main body 10 and the sliding sleeve 31.

The valve device 40 is mounted between the main body 10 and the positioning mount 20, and has a sealing collar 41, a valve body 43 and a valve spring 45. The sealing collar 41 is mounted between the main body 10 and the positioning mount 20, and has a through hole defined through the sealing collar 41 and communicating with the valve chamber 11 of the main body 10 and the plug chamber 21 of the positioning mount 20. The valve body 43 is movably mounted in the through hole of the sealing collar 41 and has a channel 431, two air inlets 435 and a stop flange 437. The channel 431 is formed in the valve body 43 and has a closed end 432 facing the main body 10 and an open end 433 facing the positioning mount 20. The two air inlets 435 are radially defined in the valve body 43 and communicate with the channel 431 of the valve body 43. Preferably, the two air inlets 435 are diametrically opposite each other. The stop flange 437 is formed around and protrudes outward from the closed end 432 of the valve body 43. The sectional area of the stop flange 437 is larger than the sectional area of the through hole of the sealing collar 41, and the stop flange 437 closes the through hole of the sealing collar 41. The valve spring 45 is mounted in the valve chamber 11 of the main body 10, and two ends of the valve spring 45 respectively abut against the stop flange 437 of the valve body 43 and the end surface of the valve chamber 11 of the main body 10 to provide a force for keeping the valve body 43 in a closed condition.

Figure 3:
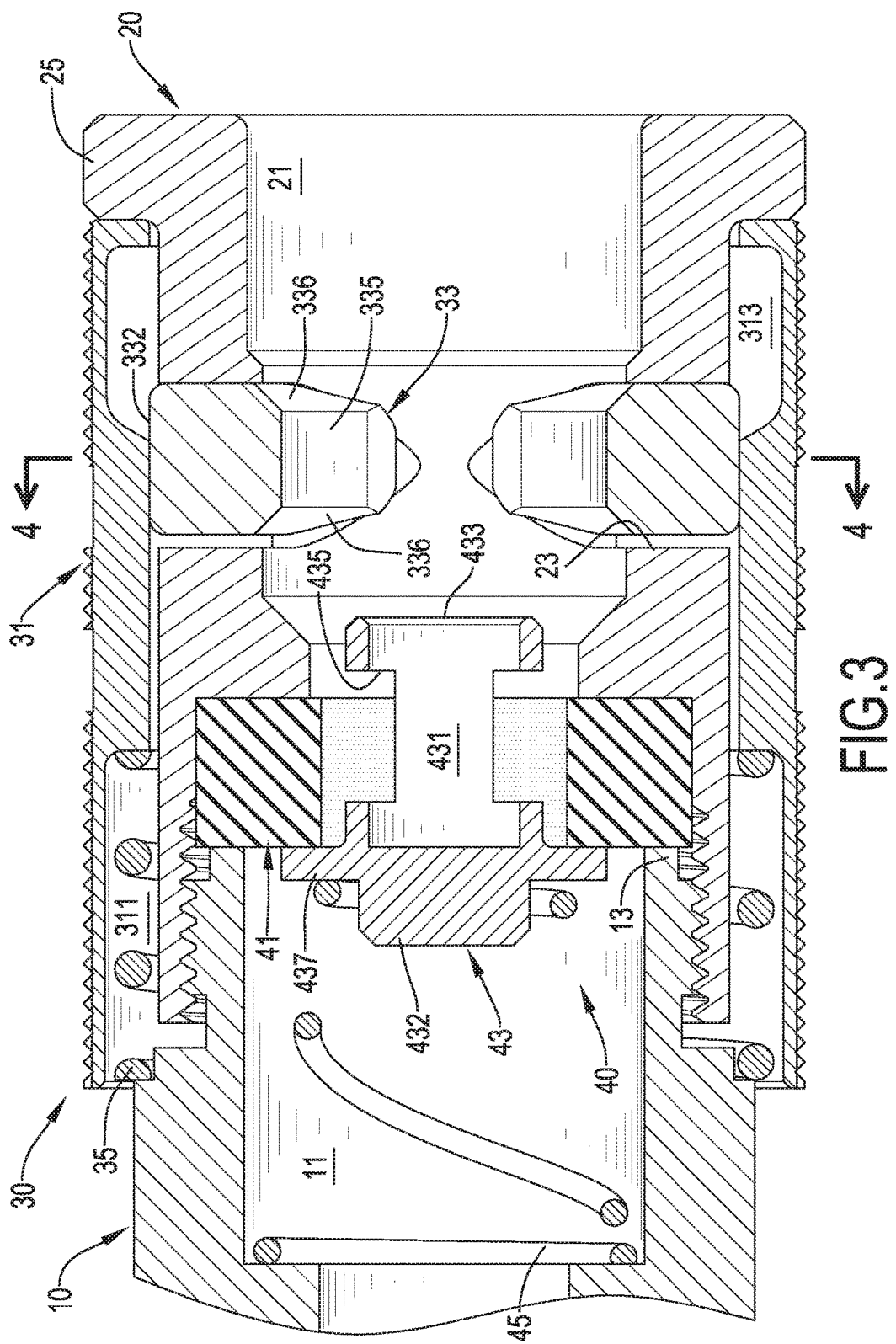
FIG. 3 is an enlarged cross sectional side view of the wedge clamp quick release connector in FIG. 1.
Figure 4:
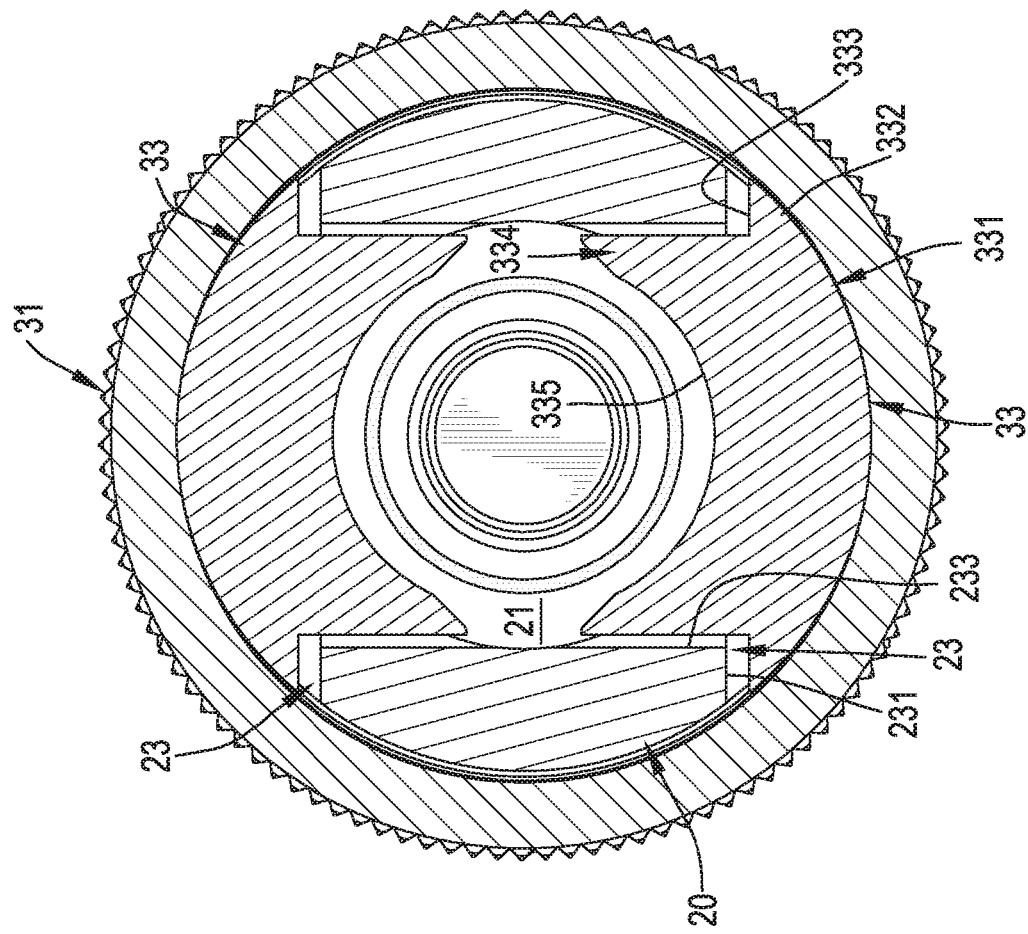
FIG. 4 is a cross sectional end view of the wedge clamp quick release connector along the line 4-4 in FIG. 3.

With reference to FIGS. 3 and 4, the sliding sleeve 31 is pushed by the sleeve spring 35 to abut against the flange 25 of the positioning mount 20, and the clamp recess 313 of the sliding sleeve 31 is shifted away from the wedge clamps 33. The shoulder portion 331 of each wedge clamp 33 is blocked between the inner surface of the sliding sleeve 31 and the shoulder plane 231 of the corresponding wedge clamp hole 23 of the positioning mount 20, and the wedge portion 334 of each wedge clamp 33 is inside the plug chamber 21 of the positioning mount 20. The valve body 43 of the valve device 40 is pushed by the valve spring 45, and the stop flange 437 of the valve body 43 abuts the sealing collar 41 and closes the through hole of the sealing collar 41.

Figure 7:
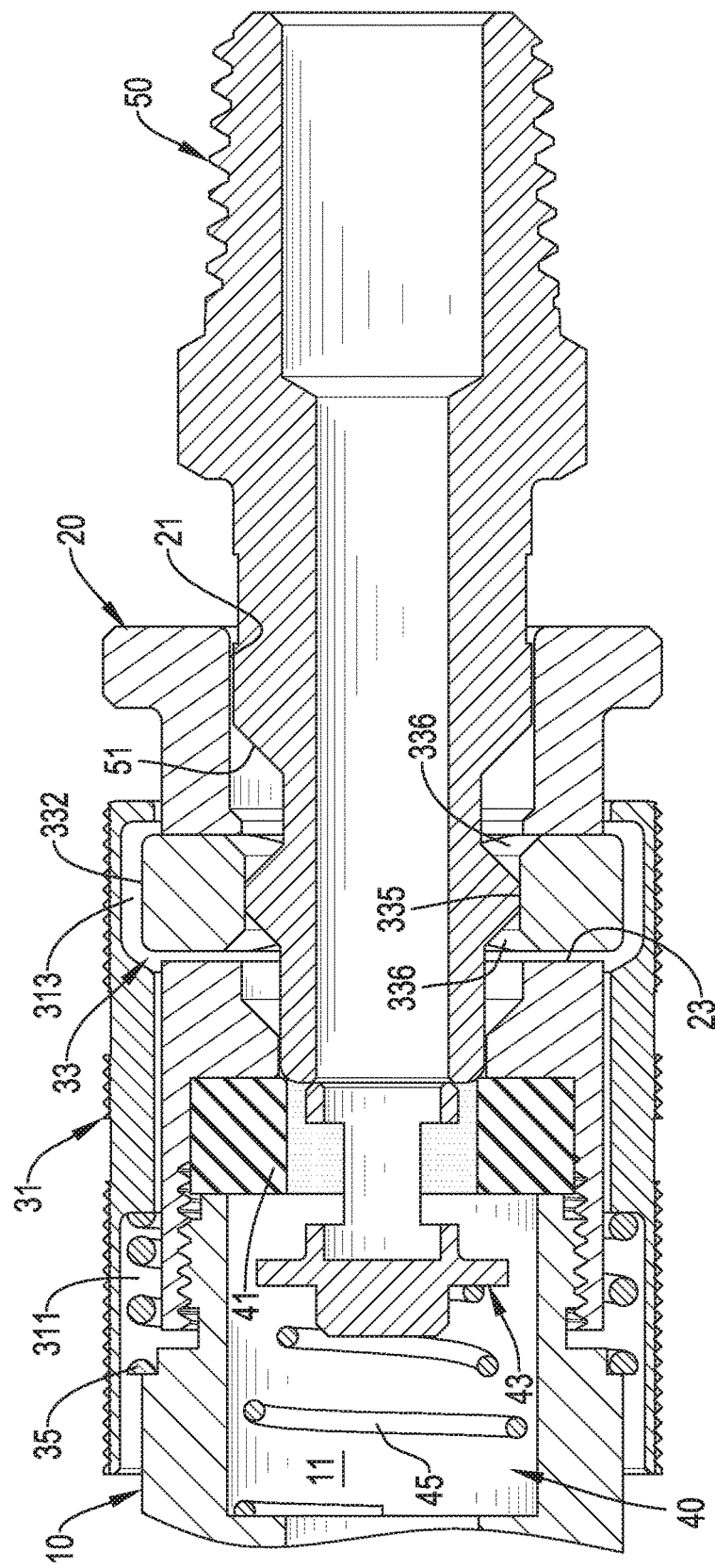
FIG. 7 is an enlarged operational cross sectional side view of the wedge clamp quick release connector in FIG. 1, showing a plug being inserted to the connector and pushing the wedge clamps outward.

With reference to FIG. 7, to connect a plug 50 with the connector, the sliding sleeve 31 is pushed toward the main body 10 to align the clamp recess 313 of the sliding sleeve 31 with the wedge clamps 33. When the sliding sleeve 31 is being pushed, the plug 50 may be inserted into the plug chamber 21 of the positioning mount 20, and the wedge clamps 33 will be pushed outward to the clamp recess 313 of the sliding sleeve 31 by the plug 50, when the plug 50 is being inserted.

Figure 5:
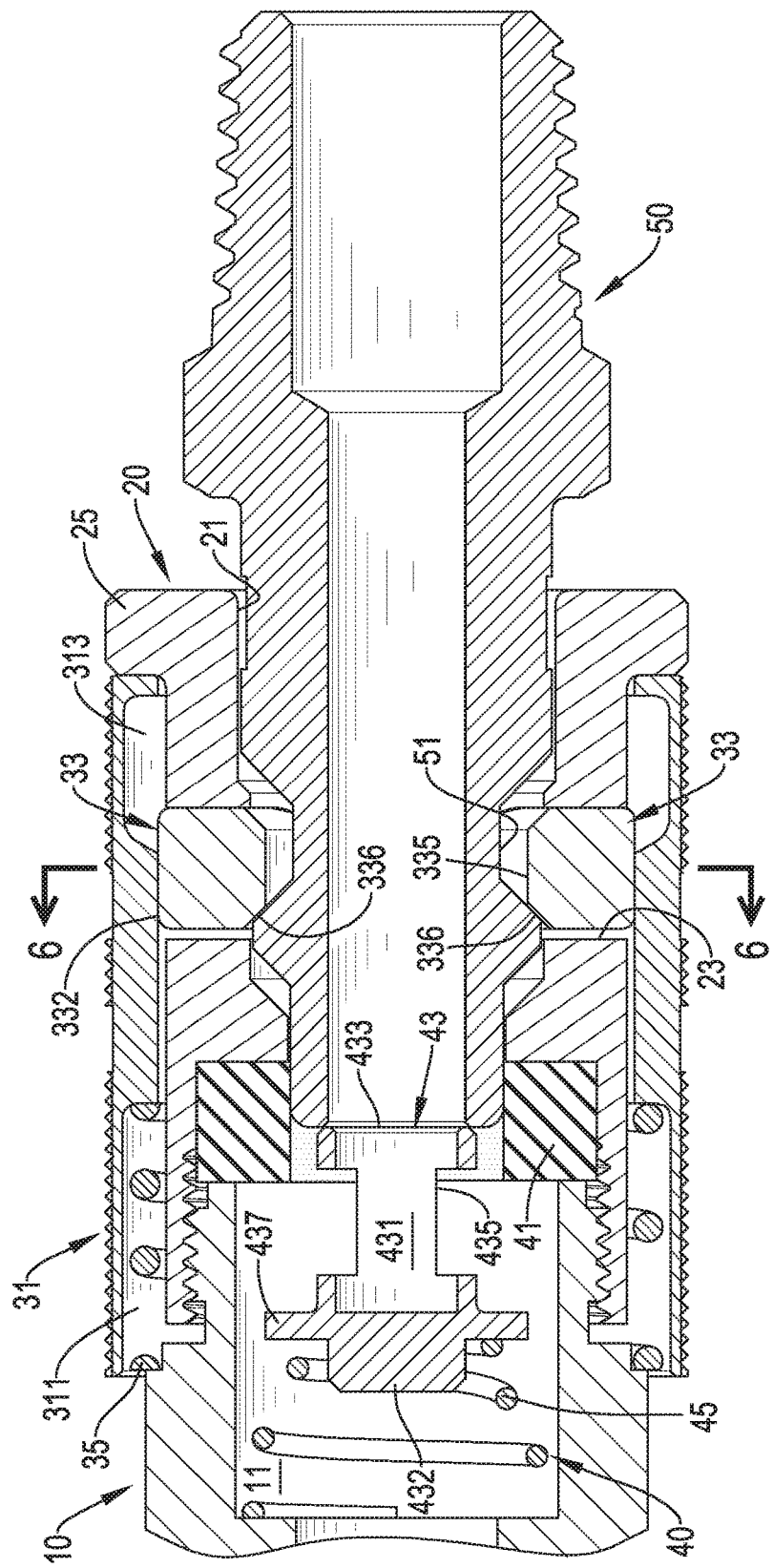
FIG. 5 is an enlarged operational cross sectional side view of the wedge clamp quick release connector in FIG. 1, shown connected with a plug.
Figure 6:
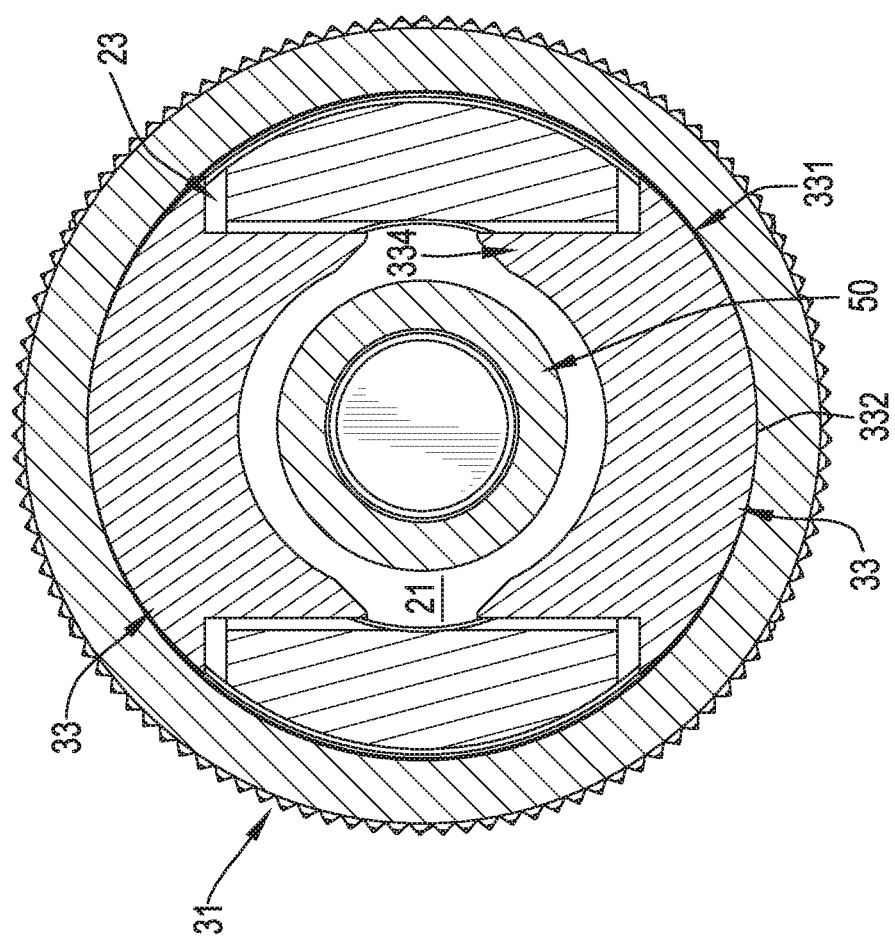
FIG. 6 is an operational cross sectional end view of the wedge clamp quick release connector along the line 6-6 in FIG. 5.

With reference to FIGS. 5 and 6, after the plug 50 is inserted to the fixed position, the sliding sleeve 31 may be released. The clamp recess 313 of the sliding sleeve 31 will be shifted away from the wedge clamps 33 with the sliding sleeve 31. The wedge portions 334 of the wedge clamps 33 will be inside the plug chamber 21 of the positioning mount 20, and will be mounted in the recess 51 of the plug 50 to engage the plug 50. Because the recess 51 of the plug 50 has a bevel corresponding to the bevel 336 of the wedge clamps 33 facing the main body 10, when the wedge clamps 33 are engaged with the plug 50, the bevels 336 of the wedge clamps 33 facing the main body 10 are mounted around and are engaged with the recess 51 of the plug 50 and contact the bevel of the recess 51 of the plug 50. When the plug 50 is inserted to abut against the valve body 43, the valve body 43 will be pushed toward the main body 10 by the plug 50, and the inlets 435 of the valve body 43 will be moved into the valve chamber 11 of the main body 10. Air will flow into the plug 50 from the connecting end 15 of the main body 10 via the inlets 435 and the channel 431 of the valve body 23.

When the plug 50 is connected to the quick release connector in accordance with the present invention, the wedge clamps 33 and the recess 51 of the plug 50 are engaged with each other by the bevels 336 of the wedge clamps 33 that face the main body 10 and the corresponding bevel of the recess 51 of the plug 50. Because the bevels 336 of the wedge clamps 33 are mounted around and corresponding to the bevel of the recess 51 of the plug 50, the wedge clamps 33 and the plug 50 will engage with each other in a reliable surface contact. In addition, because the wedge clamps 33 and the plug 50 are in an annular surface contact, the stress of the engagement will be dispersed to the contact surfaces between the wedge clamps 33 and the plug 50 to avoid that the excessive concentrated stress damages the contacting surfaces of the recess 51 of the plug 50 and the wedge clamps 33. Moreover, when the wedge clamps 33 are blocked between the inner surface of the sliding sleeve 31 and the corresponding shoulder plane 231 of the positioning mount 20, the external surfaces 332 of the wedge clamps 33 are in contact with the inner surface of the sliding sleeve 31 by annular surface contact to avoid the excessive concentrated stress damage.

Figure 8:
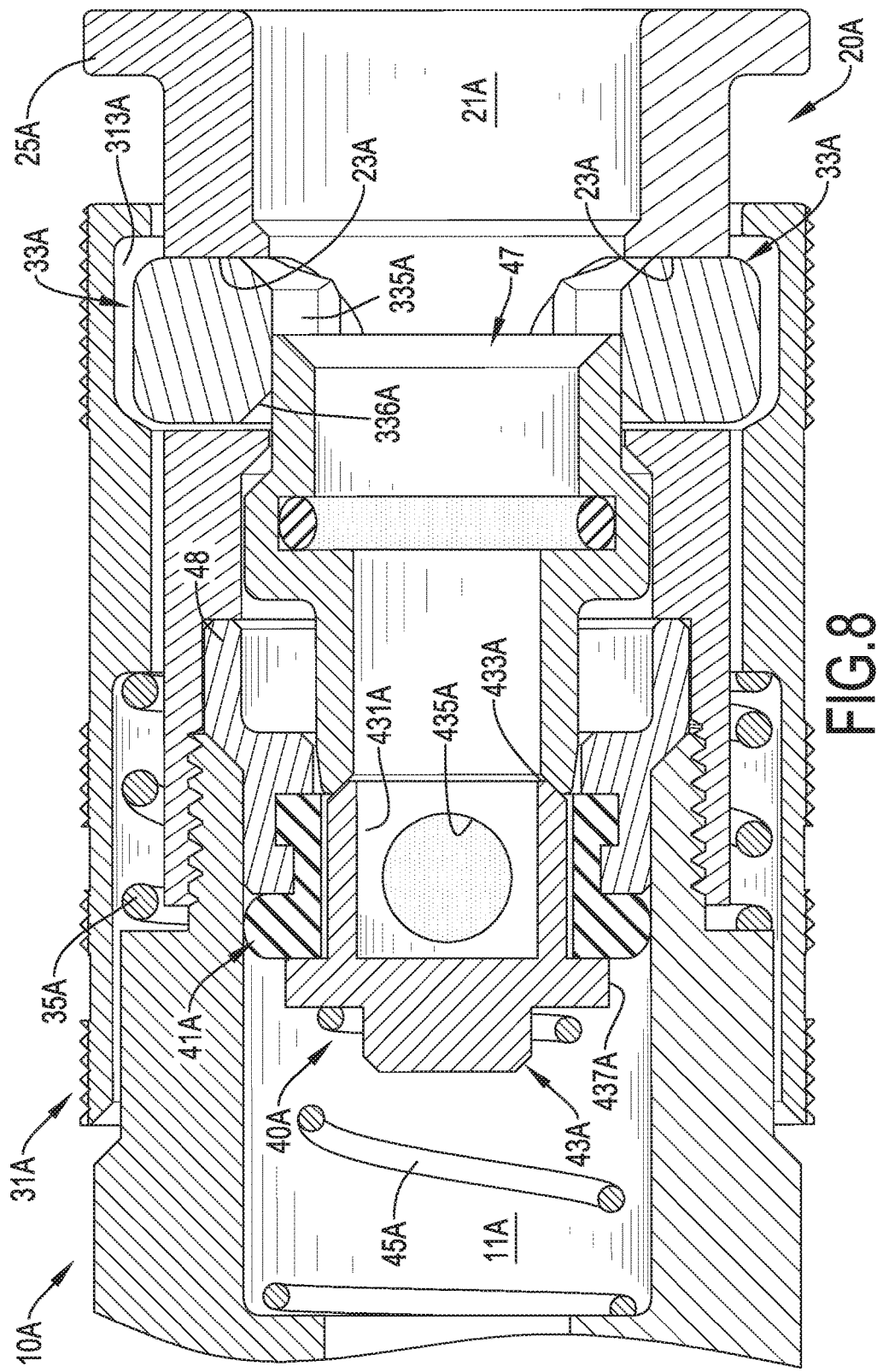
FIG. 8 is a cross sectional side view of a second embodiment of a wedge clamp quick release connector in accordance with the present invention.

With reference to FIG. 8, in the second embodiment, the valve device 40A further has a resisting collar 47 and a holding collar 48. The resisting collar 47 is mounted in the plug chamber 21A of the positioning mount 20A, and abuts the open end 433A of the valve body 43A. The resisting collar 47 is tubular, and has two open ends communicating with the plug chamber 21A of the positioning mount 20A and the channel 431A of the valve body 43A. The holding collar 48 is mounted between the main body 10A and the positioning mount 20A, is engaged with the sealing collar 41A, and has a through hole being adjacent to the through hole of the sealing collar 41A.

In a normal condition, the valve body 43A is pushed by the valve spring 45A, and the stop flange 437A of the valve body 43A abuts against the sealing collar 41A and closes the through hole of the sealing collar 41A. The resisting collar 47 is pushed by the valve body 43A to push the wedge clamps 33A outward and toward the clamp recess 313A of the sliding sleeve 31A, and the sliding sleeve 31A is engaged with the wedge clamps 33A. A plug 50 may be inserted in the connector without the user's manually pushing the sliding sleeve 31A.

Figure 9:
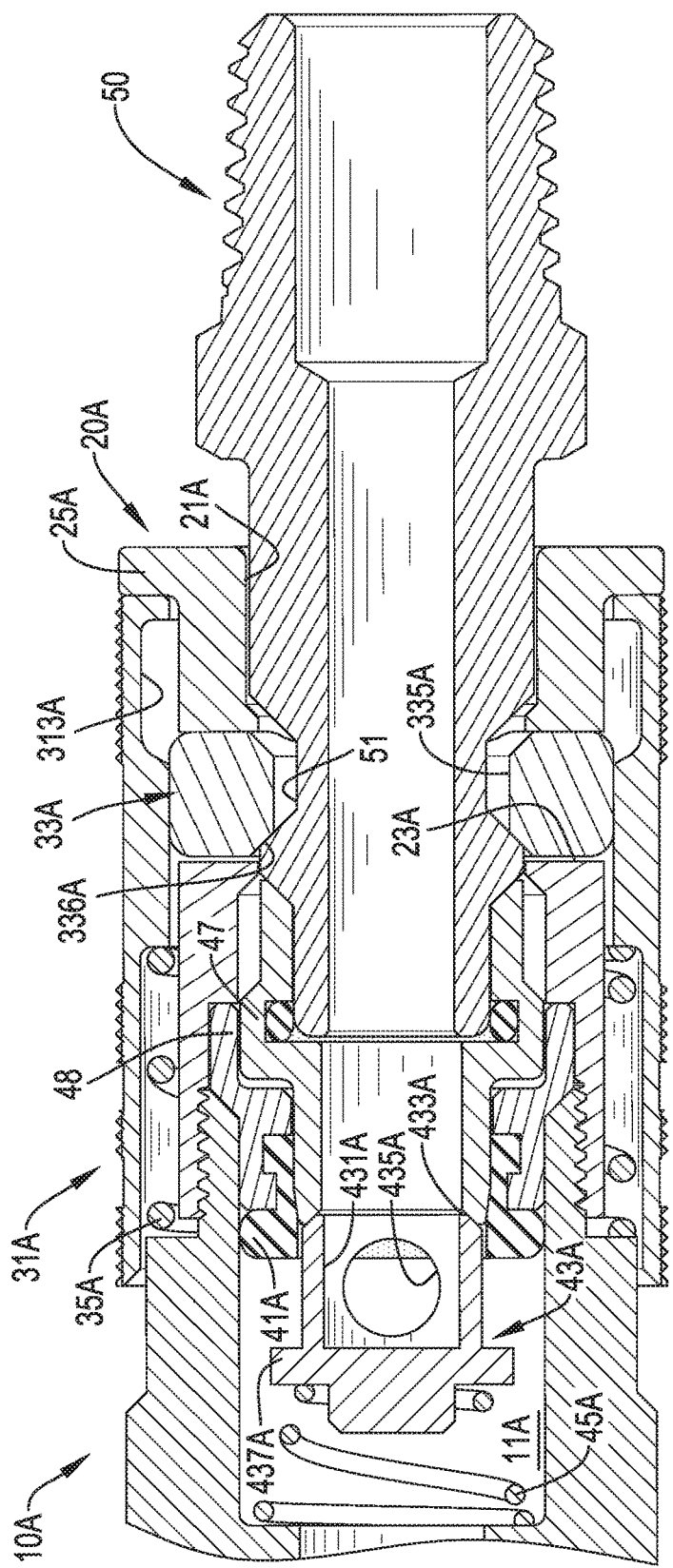
FIG. 9 is an operational cross sectional side view of the wedge quick release connector in FIG. 8, shown connected with a plug.
Figure 10:
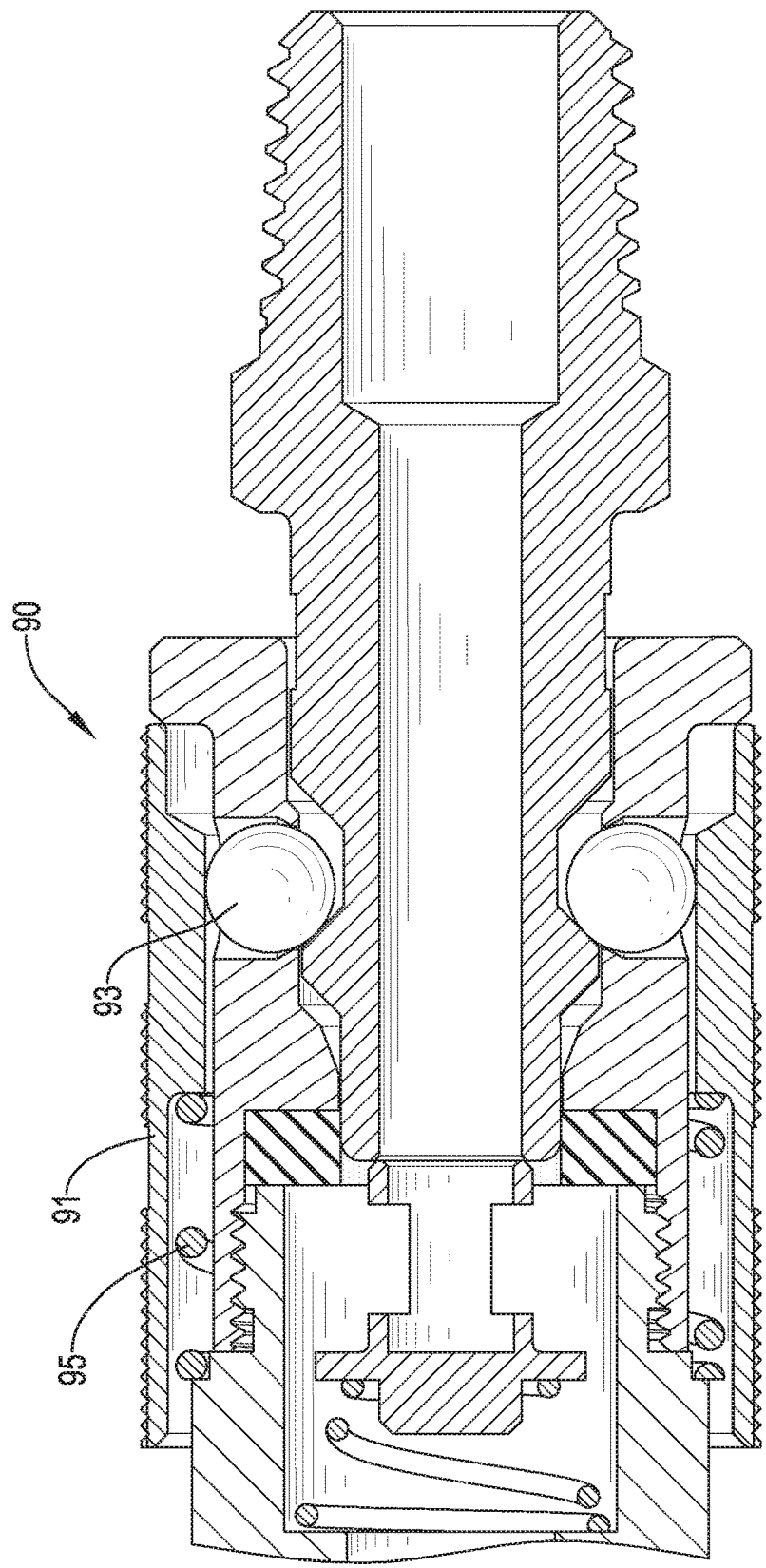
FIG. 10 is a cross sectional side view of a conventional connector connected with a plug.

With reference to FIG. 9, when a plug 50 is inserted to abut against the resisting collar 47, the resisting collar 47 will be pushed away from the wedge clamps 33A by the plug 50. The wedge clamps 33A may be mounted in the recess 51 of the plug 50 to engage the plug 50, and the sliding sleeve 31A will be pushed toward the positioning mount 20A by the sleeve spring 35A to keep the wedge clamps 33A being engaged with the plug 50. The valve body 43A will be pushed toward the main body 10A by the resisting collar 47, and the inlets 435A of the valve body 43A will be moved into the valve chamber 11A of the main body 10. Air will flow into the plug 50 from the connecting end 15 of the main body 10 via the inlets 435A and the channel 431A of the valve body 43A.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wedge clamp quick release connector comprising:
   a main body being tubular and having
      an air passage formed in the main body; and
      two ends being opposite each other and respectively defined as a mounting end and a connecting end, and each end having an opening communicating with the air passage;
   a positioning mount detachably connected to the mounting end of the main body by a threaded connection, being tubular, and having
      a peripheral wall;
      a plug chamber formed in the positioning mount and having an opening being away from the main body; and
      at least one wedge clamp hole formed radially through the peripheral wall of the positioning mount and communicating with the plug chamber, and each one of the at least one wedge clamp hole having
         an outer portion formed in the peripheral wall of the positioning mount away from the plug chamber;
         an inner portion formed in the peripheral wall of the positioning mount, and extending from a middle of the outer portion of the wedge clamp hole to the plug chamber; and
         a shoulder plane formed between the outer portion and the inner portion of the wedge clamp hole;
   a valve device mounted between the main body and the positioning mount, and selectivity communicating with the air passage of the main body and the plug chamber of the positioning mount; and
   a quick connecting device mounted on the positioning mount and having
      a sliding sleeve slidably mounted around the positioning mount and having
         two ends;
         a spring recess formed in one of the ends of the sliding sleeve facing the main body; and
         a clamp recess formed in the other end of the sliding sleeve opposite the spring recess;
      at least one wedge clamp movably held in the at least one wedge clamp hole of the positioning mount, and each one of the at least one wedge clamp having
         a shoulder portion formed on the wedge clamp away from the positioning mount and having an external surface being convex and a stop plane facing the shoulder plane of a corresponding one of the at least one wedge clamp hole of the positioning mount; and
         a wedge portion mounted in the inner portion of the corresponding one of the at least one wedge clamp hole, formed on and protruding from a middle of the stop plane of the shoulder portion of the wedge clamp, and having
            an internal surface formed on an end of the wedge portion opposite to the shoulder portion, the internal surface being concave and having two curved edges; and
            two bevels respectively formed along the curved edges of the internal surface of the wedge portion; and
      a sleeve spring mounted in the spring recess of the sleeve and having two ends respectively abutting against the main body and the sliding sleeve.

2. The wedge clamp quick release connector as claimed in claim 1, wherein the valve device comprises
- a sealing collar mounted between the main body and the positioning mount, and having a through hole communicating with the air passage of the main body and the plug chamber of the positioning mount;
- a valve body movably mounted in the through hole of the sealing collar, and having
  - a channel formed in the valve body and having a closed end facing the main body and an open end facing the positioning mount;
  - at least one air inlet radially defined in the valve body and communicating with the channel of the valve body; and
  - a stop flange formed around and protruding outward from the closed end of the valve body, and a sectional area of the stop flange of the valve body being larger than a sectional area of the through hole of the sealing collar; and
- a valve spring mounted in the air passage of the main body, and having two ends respectively abutting against the main body and the valve body.

3. The wedge clamp quick release connector as claimed in claim 2, wherein the positioning mount has two said wedge clamp holes being diametrically opposite each other, and the quick connecting device has two said wedge clamps each movably held in a respective one of the wedge clamp holes of the positioning mount.

4. The wedge clamp quick release connector as claimed in claim 3, wherein the air passage of the main body has multiple different inner diameters, and the largest of the diameters of the air passage is defined at a portion abutting the mounting end of the main body.

5. The wedge clamp quick release connector as claimed in claim 4, wherein the positioning mount further has a flange protruding outward around the peripheral wall of the positioning mount near the opening of the plug chamber.

6. The wedge clamp quick release connector as claimed in claim 5, wherein the main body has connecting threads respectively formed at the two ends of the main body.

7. The wedge clamp quick release connector as claimed in claim 1, wherein the valve device comprises
- a sealing collar mounted between the main body and the positioning mount, and having a through hole communicating with the air passage of the main body and the plug chamber of the positioning mount;
- a valve body movably mounted in the through hole of the sealing collar, and having
  - a channel formed in the valve body and having a closed end facing the main body and an open end facing the positioning mount;
  - at least one air inlet radially defined in the valve body and communicating with the channel of the valve body; and
  - a stop flange formed on and protruding outward from the valve body near the closed end of the valve body, and a sectional area of the stop flange of the valve body being larger than a sectional area of the through hole of the sealing collar;
- a valve spring mounted in the air passage of the main body between the main body and the valve body; and
- a resisting collar movably mounted in the plug chamber of the positioning mount, abutting the open end of the valve body, being tubular, and having two open ends communicating with the plug chamber of the positioning mount and the channel of the valve body;
- wherein when the stop flange of the valve body abuts against the sealing collar, the resisting collar is pushed by the valve body and the at least one wedge clamp is pushed outward to the clamp recess of the sliding sleeve by the resisting collar.

8. The wedge clamp quick release connector as claimed in claim 7, wherein the positioning mount has two said wedge clamp holes being diametrically opposite each other, and the quick connecting device has two said wedge clamps each movably held in a respective one of the wedge clamp holes of the positioning mount.

\* \* \* \* \*